(12) United States Patent
Hofrichter et al.

(10) Patent No.: US 7,929,815 B2
(45) Date of Patent: Apr. 19, 2011

(54) OPTICAL COUPLING DEVICE

(75) Inventors: Jens Hofrichter, Zurich (CH); Nikolaj Moll, Zurich (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/546,844

(22) Filed: Aug. 25, 2009

(65) Prior Publication Data

US 2010/0054662 A1    Mar. 4, 2010

(51) Int. Cl.
*G02B 6/34* (2006.01)
*G02B 6/30* (2006.01)

(52) U.S. Cl. .................................... 385/37; 385/49

(58) Field of Classification Search .............. 385/31, 385/37, 49
See application file for complete search history.

(56) References Cited

U.S. PATENT DOCUMENTS

| | | | |
|---|---|---|---|
| 4,776,661 A | 10/1988 | Handa | |
| 4,869,568 A | 9/1989 | Schimpe | |
| 4,929,042 A * | 5/1990 | Hatori et al. | 385/7 |
| 5,146,518 A | 9/1992 | Mak | |
| 5,315,676 A * | 5/1994 | Sunagawa | 385/37 |
| 5,420,947 A | 5/1995 | Li | |
| 5,471,548 A * | 11/1995 | Brazas | 385/37 |
| 6,760,359 B2 * | 7/2004 | Evans | 372/102 |
| 6,813,419 B2 * | 11/2004 | Matsushima et al. | 385/50 |
| 6,823,111 B2 * | 11/2004 | Jette et al. | 385/37 |
| 7,065,272 B2 | 6/2006 | Taillaert | |
| 7,245,803 B2 * | 7/2007 | Gunn et al. | 385/37 |
| 7,260,293 B1 | 8/2007 | Gunn, III | |
| 7,298,945 B2 * | 11/2007 | Gunn et al. | 385/37 |
| 7,643,709 B2 * | 1/2010 | Van Laere et al. | 385/37 |
| 7,680,371 B2 * | 3/2010 | Cheben et al. | 385/28 |

OTHER PUBLICATIONS

M.M. Spuhler, "A Very Short Planar Silica Spot-Size Converter using a Nonperiodic Segmented Waveguide". IEEE Journal of Lightwave Technology, vol. 16, No. 9, pp. 1680, (1998).
B. Luyssaert, "A Versatile Spot-Size Converter Design". Proceedings Symposium IEEE / LEOS Benelux Chapter, Ghent, pp. 99-102, (2004).
D. Taillaert, "An out-of-plane grating coupler for efficient butt-coupling between compact planar waveguides and single mode fibers". IEEE J. of Quantum Elec., vol. 28, 2002.
S. T. Peng, "Theory of periodic dielectric waveguides," IEEE Transactions on Microwave Theory Tech. MTT-23, pp. 123-133, (1975).

* cited by examiner

*Primary Examiner* — Daniel Petkovsek
(74) *Attorney, Agent, or Firm* — Gail H. Zarick

(57) ABSTRACT

An optical coupling device for coupling a light beam into a waveguide and a method of manufacturing the device. The device includes a grating portion having a plurality of essentially straight and essentially parallel scattering elements, wherein two or more of the scattering elements have different lengths. The method includes providing a grating layer on a substrate and forming a plurality of essentially straight and essentially parallel scattering elements from the grating layer, wherein two or more of the scattering elements have different lengths.

8 Claims, 6 Drawing Sheets

OPTICAL COUPLING DEVICE

CROSS-REFERENCE TO RELATED APPLICATIONS

This application claims priority under 35 U.S.C. §119 from European Patent Application No. 08105147.6, filed Aug. 27, 2008, the entire contents of which are incorporated herein by reference.

BACKGROUND OF THE INVENTION

1. Field of the Invention

The present invention relates to an integrated optical device, for example a coupling device for coupling incident light into a waveguide. Specifically, the present invention relates to an optical coupling device and a method for manufacturing an optical coupling device.

2. Description of the Related Art

Light wave transmission can occur along optical fibres. Light can also be propagated through planar waveguide structures that can be implemented as photonic wave guides in integrated circuits. In many applications it is necessary to transmit an optical signal through a planar waveguide structure and to optically couple the light into or out of the integrated optical chip.

When testing optical circuitry on a chip it can be desirable to couple light from a core of an optical fibre, either perpendicularly or at an angle greater than zero degrees, into the integrated waveguide structure of the chip. This means that an efficient mechanism for coupling incident light into fabricated waveguides on a semiconductor wafer is desirable.

Not only is the coupling an issue but also the size mismatch of the light beam coming from, for example, a single mode fibre and the mode in the photonic waveguide implemented on a chip. The dimension of the integrated planar waveguide typically is much smaller than a light spot produced by an optical fibre.

In the past, cleaved facets on a semiconductor substrate surrounded by polymer tapers have been used to funnel the large light spot produced by a single mode optical fibre into the waveguide. Usually, the planar waveguide and the incident light beam are arranged in parallel. Such cleaved facet polymer tapers require large dimensions for delivering sufficient efficiency. However, the testing of such optical circuits on a wafer is difficult to achieve because of inconvenient lateral in-plane coupling.

Other conventional coupling mechanisms employ grating couplers with attached linear tapers. Hence, two separate devices are formed next to each other. A grating coupler comprises an array of parallel grating elements which are arranged on a substrate. Incident light, for example stemming from an optical fibre, is radiated perpendicularly or at an angle greater than zero degrees onto the grating plane. Through scattering, the light can than be coupled into the plane of the grating and fed into a photonic waveguide on the substrate.

However, the grated array is much larger than the diameter of the waveguide. Therefore, an adiabatic tapering employing an appropriate device is additionally used. Conventional gratings cover areas of around 10 by 10 μm wherein an adiabatic taper requires an additional length of about 500 μm until the modal size produced by the grating matches the modal size of the integrated waveguide of the respective optical chip. It is generally desirable to minimize the area assumed by such coupling and tapering devices.

U.S. Pat. No. 7,260,293 ('293) discloses an optical waveguide grating coupler that has a varying scatter cross section. This structure has bent gratings that correspond to curved wave fronts of light coming from an attached waveguide. In '293 two layer stacks are needed since the gratings are arranged on top of a funnel-shaped portion that merges into a corresponding waveguide.

In Michael M. Spühler, et al., "A very short planar silica spot-size converter using a nonperiodic segmented waveguide", Journal of Lightwave Technology, vol. 16, No. 9, September 1998, page 1680 (Spühler), a segmented waveguide structure with an irregular tapering is introduced for laterally coupling light into a photonic wave guide. Spühler aims at integrating a spot-size converter with a waveguide. As mentioned above, lateral coupling may not be appropriate for testing a plurality of integrated optical circuits on a wafer.

Thus, it is desirable to design an improved optical coupling device.

BRIEF SUMMARY OF THE INVENTION

The present invention provides an improved optical coupling device.

According to an aspect of the present invention, there is disclosed an optical coupling device for coupling a light beam into a waveguide. The device including a grating portion having a plurality of essentially straight and essentially parallel scattering elements, wherein two or more of the scattering elements have different lengths.

According to another aspect of the present invention, there is disclosed a method of manufacturing an optical coupling device for coupling a light beam into a waveguide. The method including the steps of: providing a grating layer on a substrate; and forming a plurality of essentially straight and essentially parallel scattering elements from the grating layer, wherein two or more of the scattering elements having different lengths.

An advantage is that standard lithography processes can be used. There is no need to cleave any samples which facilitates wafer testing. The entire coupling device can be realized employing only one layer. Hence, only one lithography and etching step is required. However, additional deposition and etch steps for producing a varying thickness can be employed. Additionally, the grating can be easily aligned.

DETAILED DESCRIPTION OF THE INVENTION

Figure 1:
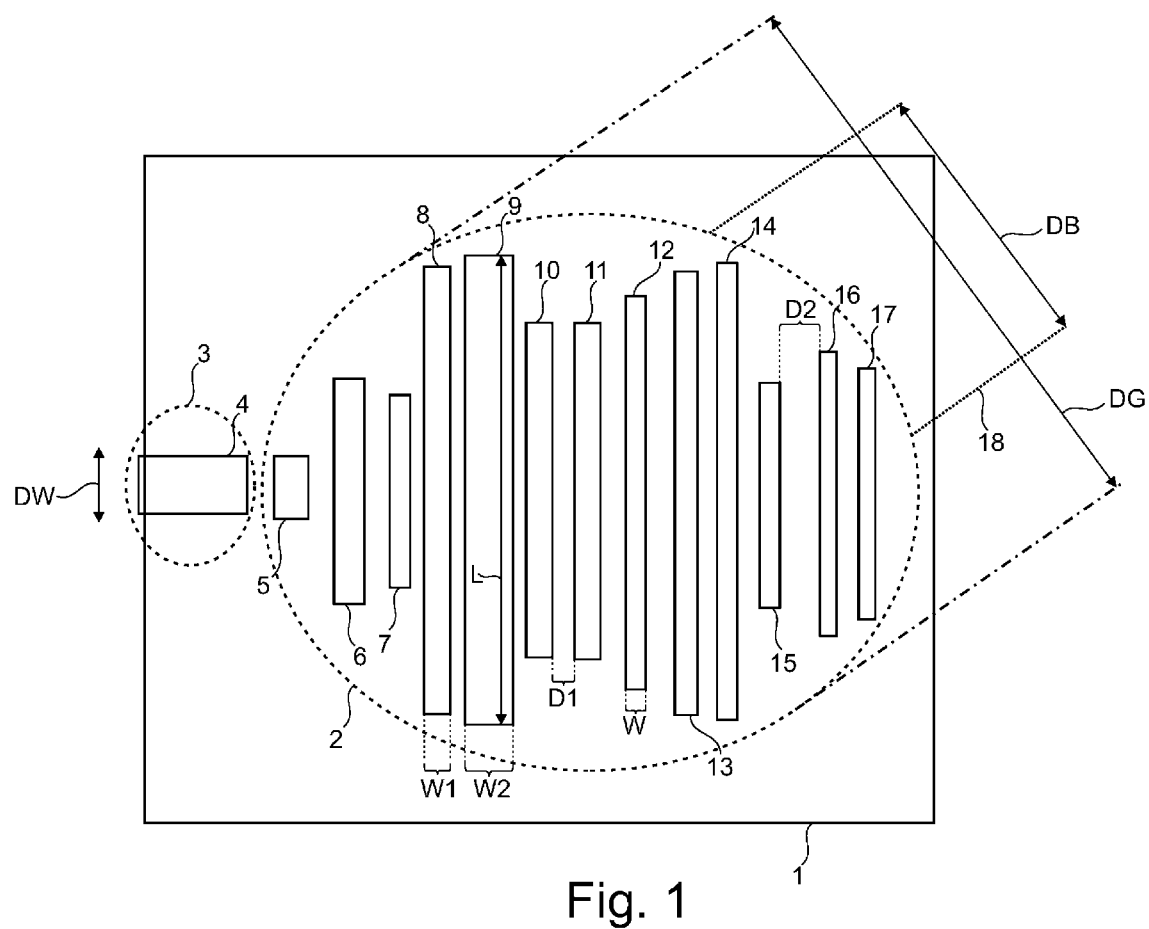
FIG. 1 shows a top view of an embodiment of an optical coupling device.

In the following, preferred embodiments of an optical coupling device and method of manufacturing the device according to the present invention are presented with reference to the figures. In the figures, like or functionally like elements have been assigned the same reference symbols.

According to an aspect of the present invention, there is disclosed an optical coupling device for coupling a light beam into a waveguide, the device including a grating portion having a plurality of essentially straight and essentially parallel scattering elements, wherein two or more of the scattering elements have different lengths.

The device can be regarded as an integrated grating coupler and spot-size converter. A plurality the scattering elements have different elongation and in a preferred embodiment all of the scattering elements have different lengths. By means of the differing lengths of the scattering elements, light is scattered at the front ends of the scattering elements and funneled or tapered towards a potentially attached photonic waveguide. Different elongations of scattering elements, grating members, grating elements or segments correspond to a lateral tapering.

It is to be understood that coupling essentially occurs not in-plane, i.e., the coupling essential does not occur parallel to the plane of the scattering elements. Rather, light is coupled onto the optical device at a non-zero angle between the incident light and the plane of the device, wherein the grating portion can be regarded as being essentially planar and defining the plane of the device. Light enters the grating portion with a non-vanishing angle with respect to the plane of the grating portion. A respective incident light beam can be coupled normal to said plane. For example, a light beam may be coupled at an angle of 45 degrees with respect to a normal vector of the grating plane.

It is understood that coupling can be either from a fibre through the optical coupling device into a chip including a photonic waveguide or coupling can be from a photonic waveguide of, or in connection with, a chip, to a sensor above the grating portion of the optical device. It is an advantage of the proposed optical coupling device that a considerable amount of chip area can be saved. Further, the device enables to perform wafer testing because perpendicular coupling or coupling at an angle of light into or from an optical device on a wafer is facilitated.

In one embodiment of the optical coupling device a waveguide portion is arranged next to the grating portion wherein the waveguide portion and the grating portion are arranged in the same plane, and the light beam is radiated onto that plane. For example, the scattering element next to the waveguide portion which waveguide portion may comprise a ridge waveguide has the essentially same length as is the width of the planar waveguide portion.

The grating portion and/or the waveguide portion can be arranged on a substrate. In a particular embodiment, the grating portion comprises only one layer. For example, the grating portion may be formed by at least partially etching a grating material deposited on a substrate. Hence, a proposed optical coupling device can be manufactured by standard CMOS processes.

Optionally, a substrate may comprise dielectric layers forming a dielectric Bragg reflector below the grating portion. Dielectric Bragg reflectors, or distributed Bragg reflectors, improve the coupling efficiency of the device. In such instance a deposition of the grating material for forming the grating portion is still considered to be on the substrate although the material is not in direct contact with the substrate but rather the at least one dielectric layer.

The scattering elements of the grating portions are preferably implemented such that the electromagnetic waves of the incident light beam are converted to a modal size corresponding to the waveguide. In particular, the lengths and the arrangement of the scattering elements are preferably determined by employing evolutionary optimization procedures that simulate the scattering processes. Such procedures provide suggestions where the front ends of the scattering elements need to be arranged in order to effect focusing of the incident light beam on the waveguide.

In another embodiment, a scattering element has a width different to the width of the neighbouring scattering element. In a further embodiment, each scattering element has a width different to the widths of its neighbouring scattering elements. Therefore, the width of a scattering element does not need to be uniform across the grating portion but can be adapted according to the needs for the scattering at the front ends, for example, according to an optimization procedure. In another embodiment, at least two distances between neighbouring scattering elements can be different.

In another embodiment, the cross section dimension of the grating portion is larger than the cross section dimension of the light beam. Efficient coupling can be assured when the entire light intensity of the light beam is radiated on the grating portion.

In a preferred embodiment, a front end of a scattering element has a non-planar shape.

According to a preferred embodiment the forming of the scattering elements includes providing a mask for a pre-structured deposition of the grating layer on the substrate; and removing of the mask thereby forming a plurality of essentially straight and parallel scattering elements. Preferably, a cladding layer can be provided finally.

FIG. 1 shows a top view of an embodiment for an optical coupling device. The optical coupling device 1 includes a grating portion 2 and a wave guide portion 3. The coupling device 1 can be used in applications where a high physical integration density is desirable, for example, chip-to-chip optical interconnects. Coupling device 1 enables coupling of incident light, for example, stemming from an optical fibre. Incident light 18 is radiated onto the plane of the grating portion 2 and is diffracted at scattering elements 5-17 as described below.

The scattering elements 5-17 are provided essentially in parallel to each other. In this disclosure it is understood that essentially parallel means parallel within a margin of tolerance. An ideal grating has parallel gratings but a deviation is acceptable without altering the diffractive function of the grating. For example, in certain applications an angle between grating elements of up to 5 degrees may still qualify as being "essentially parallel". Similarly, the term "essentially straight" is to be understood as "having no significant turnings" or "not being bent". However, inaccuracies with respect to the straightness of the grating elements within a margin of tolerance and without inferring the actual optical function of the gratings are acceptable. A person skilled in the art understands that microscopically the gratings may show deviations from ideal parallelism and straightness.

Light enters the plane of the grating and runs parallel to this plane. Scattering occurs in particular at the front ends FE of the scattering elements 5-17 and the light is funneled or fed into the waveguide 4 with high conversion efficiency. Thus, the disclosed structure captures electromagnetic waves through the grating portion 2 which concurrently converts the electromagnetic fields into a modal size that matches to the attached strap waveguide.

The proposed optical coupling device 1 has the advantage that it resolves the problem of area consuming separation of a grating coupler and an attached spot-size converter, such as an adiabatic tapering. Instead, both functions are included in one compact device without any loss of functionality or efficiency. Further, light can be irradiated or coupled out from the grating portion more or less perpendicularly to the plane of the grating.

The geometric size of the scattering elements 5-17 is chosen as to provide for a scattering pattern that can lead to modal match between a waveguide 4 and the attached grating portion 2. The waveguide 4 can be a ridge waveguide or any integrated photonic waveguide. Grating portion 2 has a cross section dimension DG which is chosen larger than the cross section dimension DB of a potential incident light beam 18. The grating or scattering elements shown in FIG. 1 have rectangular shape. Distances between rectangular straight members do not need to be uniform. For instance, the distance D1 between scattering element 10 and scattering element 11 is different from the distance D2 between scattering element 15 and scattering element 16. Also, the width W of the scattering elements does not need to be uniform. Neighbouring scattering elements 8, 9 for example have different widths W1, W2. In contrast to conventional grating couplers, the lengths or elongations of the scattering elements differ between at least some and preferably the majority of or even all of the scattering elements 5-17. This is because particularly at the front ends FE of the scattering elements 5-17 light scatters as to be prepared in an appropriate mode for entering the waveguide 4 in the waveguide portion 3.

The grating portion 2 can span over a total area of 10 by 15 μm. A grating is preferably placed on a substrate of silicon dioxide (burried oxide) while the grating is made of silicon (top silicon), thus forming a silicon-on-insulator structure. The optical index of the material of the grating is preferably chosen higher than the optical index of the substrate material for efficient guiding. For example, the substrate material can be silicon (also on top of silicon dioxide forming silicon-on-insulator structure), silicon nitride, gallium arsenide, aluminium gallium arsenide, indium phosphide, gallium nitride, indium gallium nitride, indium gallium phosphide, tantalum pentoxide, silicon or other materials.

One may use as guiding material, i.e. a top layer of the grating, a material having a higher refractive index than the substrate material. The guiding material may comprise silicon, thus forming a silicon-on-insulator structure, silicon nitride, gallium arsenide, aluminium gallium arsenide, indium phosphide, gallium nitride, indium gallium nitride, indium gallium phosphide, tantalum pentoxide, hafnium oxide, titan dioxide, lutetium oxide, gadolinium oxide, barium strontium titanate, barium titanate, strontium titanite, strontium tantalite, strontium bismuth tantalite or other materials.

Figure 2:
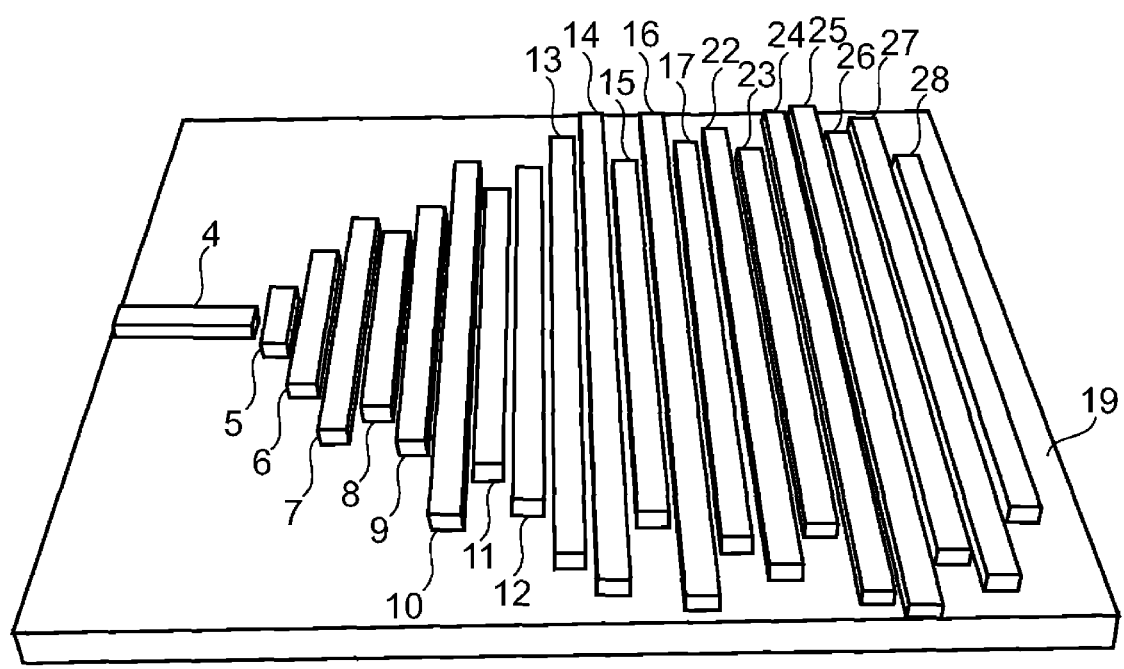
FIG. 2 shows a perspective view of a second embodiment of an optical coupling device.

FIG. 2 shows a perspective view for a similar embodiment of the optical coupling device on a substrate 19. The substrate 19 may include any of the materials mentioned above. One can see that the boundary of the grating portion including scattering elements 5-17 and 22-28 have an irregular shape. Therefore, incident light scatters at the front ends of the grating elements and can be converted for coupling into the waveguide portion 4. The grating structure is fully etched through such that grating elements are separated from each other by a void space.

Figure 3A:
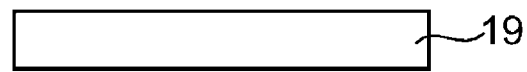
FIG. 3 shows several process steps for manufacturing an embodiment of an optical coupling device.

FIGS. 3A-3D show possible process steps in a method for manufacturing an embodiment of an optical coupling device. First, as shown in FIG. 3A, a substrate 19 is provided. It is also possible that below the substrate 19 a wafer stack can be arranged (not shown). Substrate 19, for example, includes BOX (burried oxide).

Figure 3B:
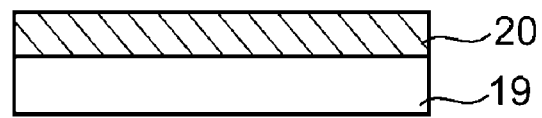

Next, as shown in FIG. 3B grating material 20 is deposited on the substrate 19. The grating material, for example, can be silicon.

Figure 3C:
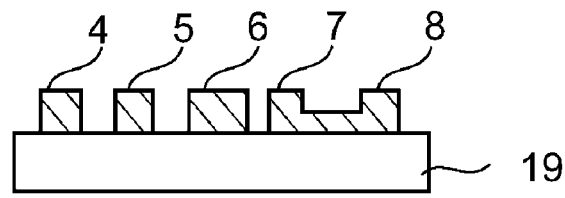

Then, as shown in FIG. 3C, the silicon or grating material can be lithographically etched to create the scattering elements 5-8 and/or a part of the ridge waveguide 4. Etching is not necessarily performed through either the substrate 19 or the grating material 20. One may also choose to only partially etch the grating structure as shown, for example, between scattering elements 7 and 8. The etching can be done conventionally creating vertical or near vertical trenches, but also slanted grooves or any advanced type of grating teeth than can be made. Scattering elements can correspond to grating teeth that comprise several steps of different geometry and size. Although FIGS. 3A-3C show cross sectional views, the overall geometry of the scattering elements correspond to the top views as shown in FIGS. 1 and 2.

Figure 3D:
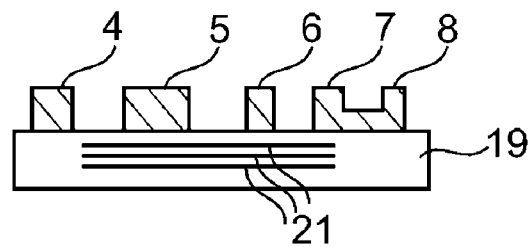

As shown in FIG. 3D, optionally, the substrate may be implemented with several dielectric layers 21 forming a dielectric Bragg reflector or distributed Bragg reflector. Also, in-plane additional first order reflectors can be placed surrounding the grating portion and/or the waveguide portion. Further, the device can be covered by a cladding that preferably reduces the index contrast of the material stack.

According to an alternative method for manufacturing an optical coupling device for perpendicular coupling or coupling at an angle of a light beam having a first cross section dimension into a waveguide having a second cross section dimension the following steps are proposed: depositing a masking material onto a top-layer of a layered structure, the masking material having a composition different than the top-layer being a guiding layer, growing epitaxially or amorphously the same material as the over-layer and performing an etching as elaborated regarding the previous implementation of a method for forming a plurality of essentially straight and parallel scattering elements, wherein the scattering elements have different lengths.

A further alternative method may further include the steps of: providing a substrate and applying a mask (e.g. photoresist), which is structured (e.g. by lithography) and then deposited either epitaxially or amorphously as the topmost layer to be the guiding material. Afterwards, the mask can be removed and a cladding may be applied. A person skilled in the art would also contemplate to combine certain manufacturing steps of the above described variant of a method for manufacturing an optical coupling device.

Figure 4:
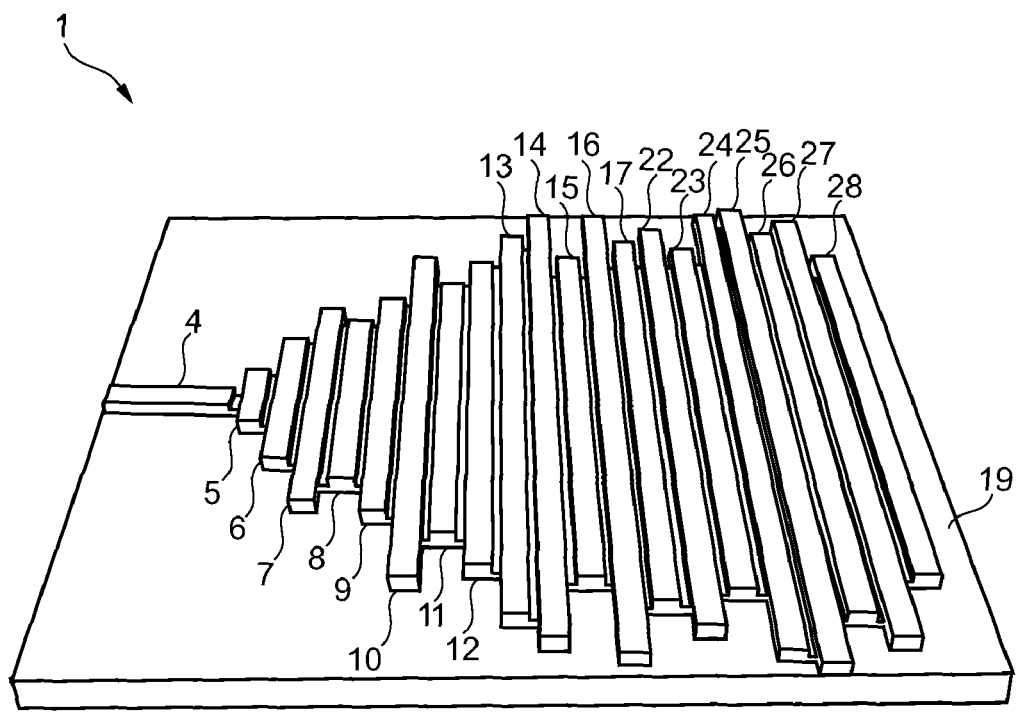
FIG. 4 shows a perspective view of a third embodiment of an optical coupling device.

FIG. 4 shows another embodiment of the optical coupling device wherein trenches between the scattering elements 5-17 and 22-28 are not entirely etched through the substrate 19.

Figure 5:
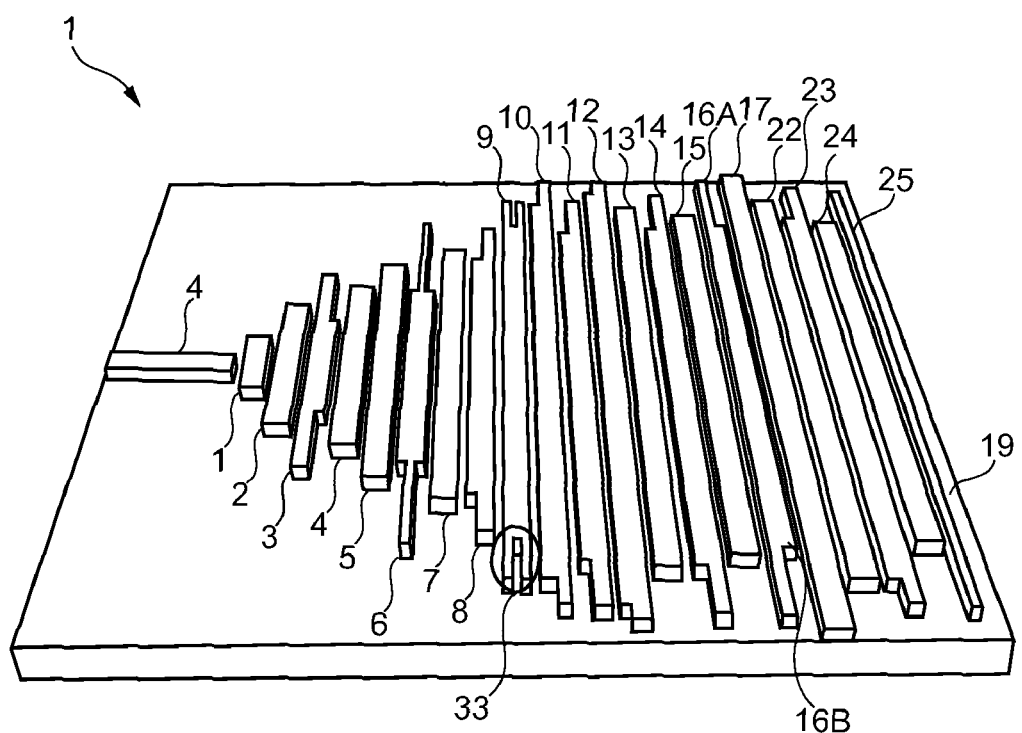
FIG. 5 shows a perspective view of a fourth embodiment of an optical coupling device.

FIG. 5 shows yet another embodiment of an optic coupling device wherein scattering elements 5-17 and 22-25 are arranged in parallel with respect to their longitudinal axis but have non-planar shapes at some of the front ends. In particular, the such "irregular" shape is prominent for gratings 3, 6, 8, 9, 10, 11, 12, 16 and 23. For example, the front end 33 of scattering element 9 shows two parallel fingers extending from a main member which has rectangular size. Also, scattering element 16A, 16B has a non-planar front end. For example, one may regard this scattering element as comprising two scattering elements 16A and 16B merged or attached to each other along their elongation. One can see that the scattering elements do not need to be uniform in length, width, shape or period. However, the scattering elements are essentially parallel to each other.

Figure 6:
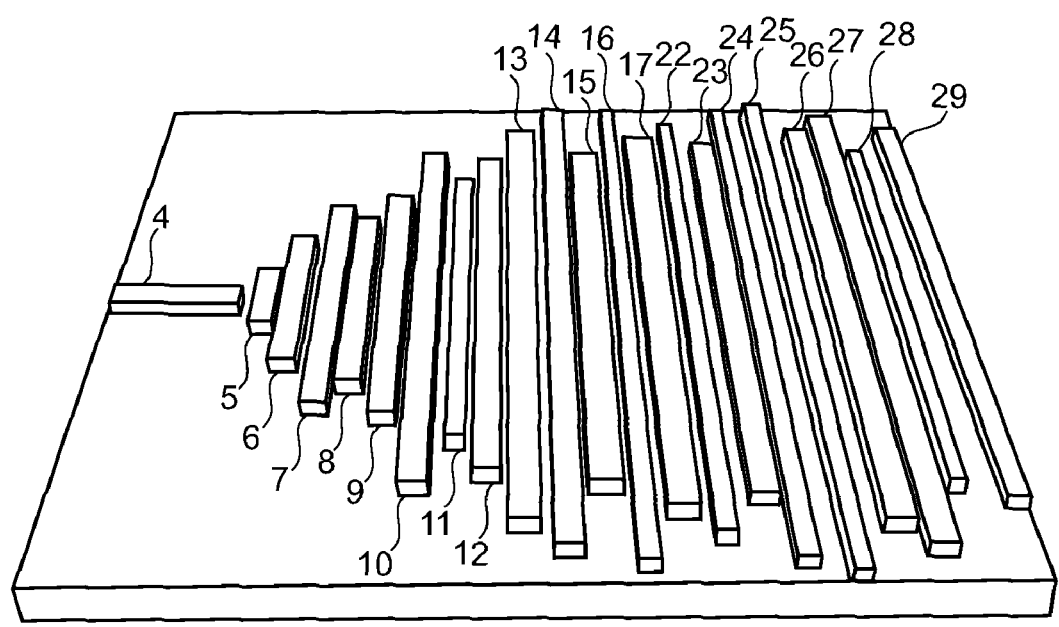
FIG. 6 shows a perspective view of a fifth embodiment on an optical coupling device.

FIG. 6 shows yet another embodiment of an optical coupling device in a perspective view. FIG. 6 illustrates that scattering elements 5-17 and 22-29 can have different width and distances with respect to each other. The actual shape of the scattering elements or members is determined by the desired scattering pattern for incident perpendicular light or light incident at an angle or light coming from the wave guide 4 into the grating portion.

Figure 7:
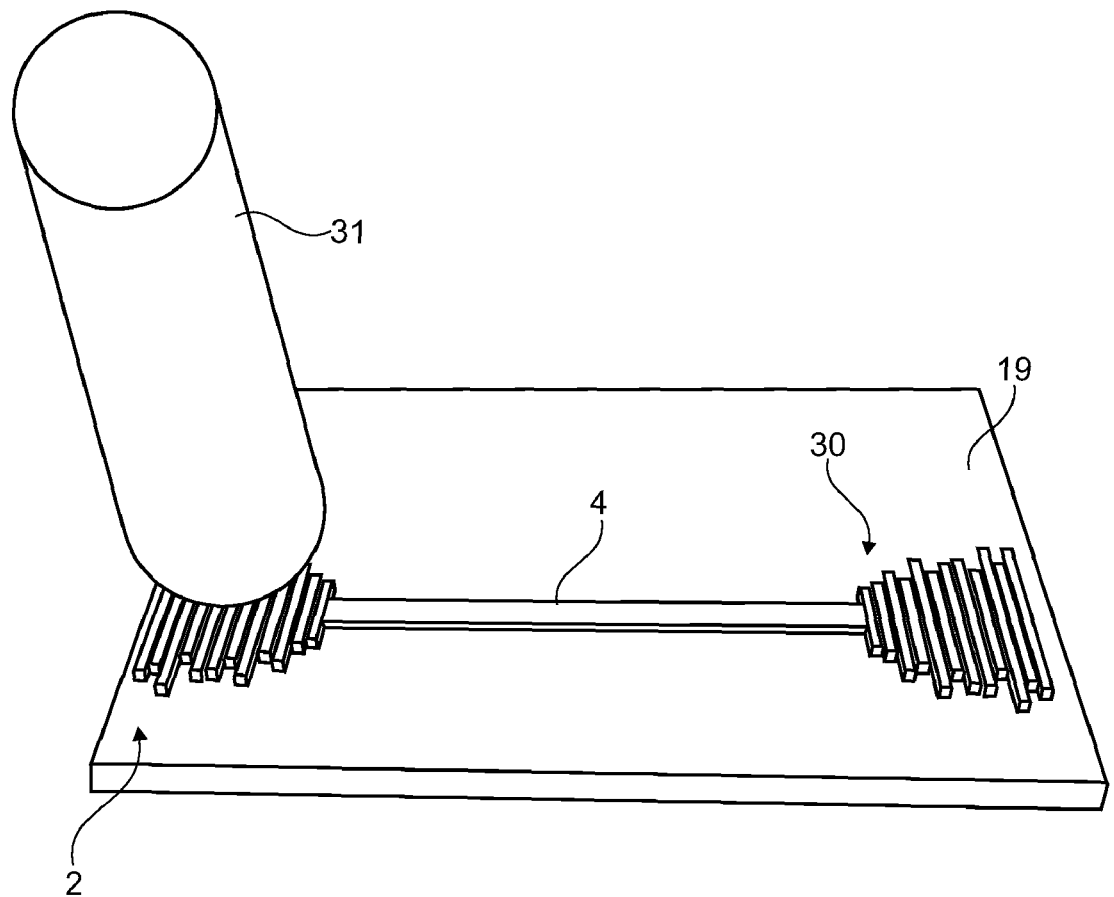
FIG. 7 shows a perspective view of a device implementing embodiments of the optical coupling device.

FIG. 7 shows a device 100 including an optical coupling device as shown above. On a substrate 19, two combined spot-size converter and grating coupler devices 2, 30, or grating portions respectively, are arranged. The grating portions 2 and 30 are coupled through a waveguide 4 placed between them. Due to a coupling efficiency of about −3 dB, light can be coupled into the waveguide 4 by the first grating portion 2 and coupled out from the waveguide 4 by a second grating portion 30. FIG. 7 also depicts a single mode optical fibre 31 radiating light more or less perpendicularly onto the first grating portion 2. The shown arrangement refers to wafer testing where, for example, optical coupling devices or grating portions are arranged on a semiconductor wafer that also includes optical devices that are coupled to each other through waveguides. For testing the operation of optical integrated devices light can be coupled into the waveguide and transmitted to the relevant devices or optical processing apparatuses and decoupled at a second grating portion 30.

All of the described implementations of optical coupling devices can easily be obtained through standard CMOS fabrication processes. Instead of several hundreds of microns taper length the proposed coupling devices only cover areas of about 10 by 10 microns. The integrated spot-size converter and grating couplers provide for modal matching. In one embodiment only one layer and thereby one lithography and etching step are required to obtain the grating elements on a substrate. Although the invention is disclosed with respect to certain preferred embodiment, variations having combinations of features can be contemplated without departing from the spirit and scope of the invention.

What is claimed is:

1. An integrated grating coupler/spot-size converter device for coupling a light beam into a waveguide, the device comprising:
    a substrate; and
    a grating portion arranged on the substrate having a plurality of essentially straight and essentially parallel scattering elements,
    wherein two or more of the scattering elements have different lengths and arrangements in order to convert a spot-size of the light beam to match the size of the waveguide; and
    wherein the scattering elements have a top side essentially opposite the substrate for receiving the light beam applied onto the scattering elements at a non-zero angle with respect to a plane of the grating portion.

2. The device of claim 1, further comprising:
    a waveguide portion next to the grating portion, wherein the waveguide portion and the grating portion are arranged in one plane.

3. The device of claim 2, wherein the scattering elements of the grating portion are configured to capture electromagnetic waves of the light beam and convert the electromagnetic waves to a modal size corresponding to the waveguide.

4. The device of claim 1, wherein the substrate comprises at least one dielectric layer.

5. The device of claim 1, wherein one of the scattering elements has a width and at least one neighbouring scattering element has a different width.

6. The device of claim 1, wherein at least one distance between neighbouring scattering elements is different from at least one other distance between neighbouring scattering elements.

7. The device of claim 1, wherein a cross section dimension of the grating portion is larger than a cross section dimension of the light beam.

8. The device of claim 1, wherein at least one front end of at least one scattering element is non-planar.

* * * * *